United States Patent [19]

Kleiner et al.

[11] 3,957,920

[45] May 18, 1976

[54] VINYL ESTER POLYMERS CONTAINING HINDERED PHENOLIC GROUPS

[75] Inventors: Eduard Karl Kleiner, New York; Martin Dexter, Briarcliff Manor, both of N.Y.

[73] Assignee: Ciba-Geigy Corporation, Ardsley, N.Y.

[22] Filed: Mar. 6, 1975

[21] Appl. No.: 556,070

Related U.S. Application Data

[63] Continuation-in-part of Ser. No. 290,425, Sept. 19, 1972, abandoned, which is a continuation of Ser. No. 68,563, Aug. 31, 1970, abandoned.

[52] U.S. Cl. .................. 260/897 B; 260/47 UA; 260/62; 260/859 R; 260/874; 260/876 R; 260/45.85 B; 260/887; 260/899; 260/901
[51] Int. Cl.² .................. C08L 23/06; C08L 23/12
[58] Field of Search .................. 260/47 UA, 62, 897

[56] References Cited
UNITED STATES PATENTS

| | | | |
|---|---|---|---|
| 2,801,980 | 8/1957 | Spacht | 260/4 |
| 2,801,981 | 8/1957 | Spacht | 260/4 |
| 3,265,760 | 8/1966 | Tocker | 260/836 |
| 3,433,835 | 3/1969 | Muller et al. | 260/562 |
| 3,457,328 | 7/1969 | Blatz et al. | 260/857 |
| 3,477,991 | 11/1969 | Patton et al. | 260/47 |
| 3,645,970 | 2/1972 | Kleiner | 260/47 U |

FOREIGN PATENTS OR APPLICATIONS

| | | |
|---|---|---|
| 1,931,452 | 1/1970 | Germany |
| 1,087,999 | 10/1967 | United Kingdom |
| 848,354 | 9/1960 | United Kingdom |

OTHER PUBLICATIONS

Hardy et al., *Vysokomolekulyarnye Soedin*, 3, 213–214 (1961).
Tockor, *Makromol. Chem.* 101, 23–32 (1967).

*Primary Examiner*—Carman J. Seccuro
*Attorney, Agent, or Firm*—Nestor W. Shust

[57] ABSTRACT

Vinyl ester homopolymers and copolymers containing hindered phenolic groups are novel materials which are useful as antioxidants. These polymers protect against oxidative and thermal degradation or deterioration of organic materials in general and more particularly synthetic polymers such as polyolefins. The vinyl ester polymers are obtained by subjecting to polymerizing conditions (a) a vinyl ester monomer containing a hindered phenolic group, either alone or with another comonomer and (b) a free radical initiator.

23 Claims, No Drawings

VINYL ESTER POLYMERS CONTAINING HINDERED PHENOLIC GROUPS

This application is a continuation-in-part of application Ser. No. 290,425, filed Sept. 19, 1972, abandoned, which in turn was a continuation of Ser. No. 68,563, filed Aug. 31, 1970, now abandoned.

BACKGROUND OF THE INVENTION

The prevention of oxidation of various organic materials is obviously of primary industrial concern and therefore antioxidants are used in or added to a wide variety of commercial products such as synthetic polymers of the type indicated supra, oils, plastics, etc., which are normally subject to oxidative deterioration.

The mechanism of the action of a hindered phenol compound as an antioxidant has not been definitely established. It is believed, however, that the hindered phenol acts as a chain-stopper for the free radical chain mechanism of oxidation either by donation of hydrogen or donation of an electron to a free radical involved in the oxidation process or the combination of a free radical with the aromatic ring of the antioxidant either by direct addition or by π-complex formation.

It is generally believed that free radicals, necessary for the polymerization of vinyl and related monomers, are trapped by antioxidants such as hindered phenols. For this reason, polymerizations of vinyl monomers carrying a phenolic group or a hindered phenolic group were carried out by a series of steps which included (a) esterification of the phenol group, (b) free radical polymerization of the vinyl group and (c) hydrolysis of the ester group to obtain the desired polymeric antioxidant. This procedure is illustrated by S. N. Ushakov et al., USSR Pat. No. 149,888 as follows:

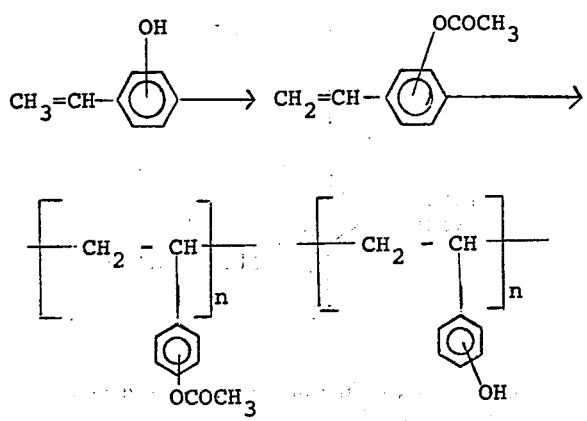

and by G. Manecke + G. Bourwieg, Makromolekare Chemie, 99 (1966) 175–185 as follows:

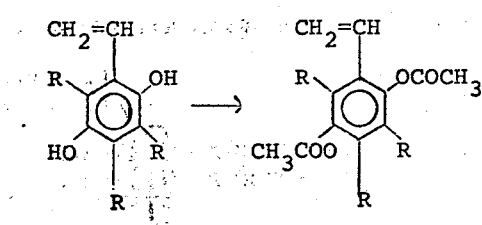

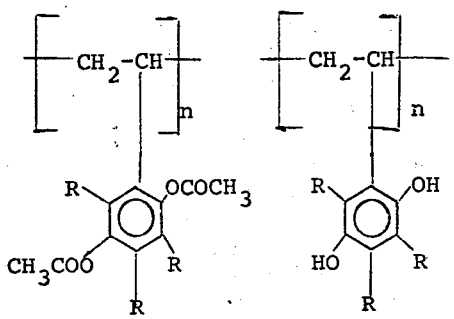

It has now been found that monomers containing hindered phenolic groups can be directly polymerized by free alkyl- or aryl- radicals to produce the desired polymeric antioxidants of the present invention.

DETAILED DISCLOSURE

The instant invention is directed to novel vinyl ester homopolymers and copolymers containing in the repeating polymeric units hindered phenolic groups and to the process for preparing said polymers. It is also directed to organic materials and especially synthetic polymers, such as polyolefins, which are stabilized against oxidative and thermal degradation by incorporating therein the novel polymers of this invention.

In the process of the present invention, the desired polymeric antioxidants are prepared by subjecting to polymerizing conditions, (a) a monomer compound derived from a vinyl ester containing a hindered phenolic group and a comonomer if a copolymer is to be prepared and (b) a free radical initiator. The initiator is a compound which can dissociate into an alkyl- or aryl- radical. Consequently, in the present invention, a single step process is utilized in the preparation of the desired polymeric antioxidants thereby avoiding the multi-step procedures of the prior art set out above.

Thus, an essential reactant in the preparation of the polymeric antioxidants of the present invention is an initiator which can react with the antioxidant monomer to obtain directly, i.e., in one step, the desired polymeric antioxidants. Included among the initiators are azo-nitriles and azo-derivatives which dissociate into alkyl- or aryl- radicals at temperatures convenient for polymerization reaction. The best known example of an azo-nitrile is 2,2'-azobisisobutyronitrile and the dissociation providing the required alkyl-radical is shown as follows:

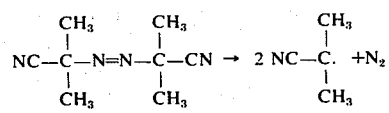

Other azo-nitriles and azo-derivatives which can be used to react with the aforesaid antioxidant monomers to prepare the desired products of the invention are described in J. Brandrup and E. H. Immergut, Polymer Handbook (John Wiley & Sons) 1965 pages II-3 to II-14 and include, for example 2-cyano-2-propyl-azo-formamide
2,2'-azo-bis-isobutyronitrile
2,2'-azo-bis-2-methylpropionitrile
1,1'-azo-bis-1-cyclobutanenitrile
2,2'-azo-bis-2-methylbutyronitrile
4,4'-azo-bis-4-cyanopentanoic acid
1,1'-azo-bis-1-cyclopentanenitrile 2,2'-azo-bis-2-methylvaleronitrile
2,2'-azo-bis-2-cyclobutylpropionitrile
1,1'-azo-bis-1-cyclohexane nitrile
2,2'-azo-bis-2,4-dimethylvaleronitrile
2,2'-azo-bis-2,4,4'-trimethylvaleronitrile
2,2'-azo-bis-2-benzylpropionitrile
1,1'-azo-bis-1-cyclodecane nitrile
azo-bis-(1-carbomethyoxy-3-methylpropane)
phenyl-azo-diphenylmethane
phenyl-azo-triphenylmethane
azo-bis-diphenylmethane
3-tolyl-azo-triphenylmethane Certain peroxide-initiators are similarly useful in preparing the desired polymeric antioxidant products of the present invention. The useful peroxide-initiators are those that can decompose instantly into alkyl- or aryl- radicals. The alkyl- or aryl- radicals are obtained either by instantaneous decomposition or by a rearrangement reaction of the primary decomposition products of the peroxide compound. Of the peroxides, the aliphatic acyl peroxides are most useful. The preferred aliphatic peroxide is acetyl peroxide. The decomposition of this compound into alkyl-radicals can be set out as follows:

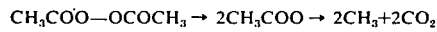

$$CH_3COO-OCOCH_3 \rightarrow 2CH_3COO \rightarrow 2CH_3 + 2CO_2$$

Reaction II follows Reaction I instantaneously. In the presence of iodine, only $CH_3I$ is isolated which is the proof of the instantaneous formation of the methyl radical. In addition to acetyl peroxide, lauroyl peroxide and decanoyl peroxide are also preferred. Other aliphatic acyl peroxides which contain up to 18 carbon atoms are also useful as initiators for the polymerization of antioxidant monomers. Such peroxide compounds include propionyl peroxide, butyryl peroxide, isobutyryl peroxide, cyclobutaneacetyl peroxide, heptanoyl peroxide, caprylyl peroxide, cyclohexane acetyl peroxide, nonanoyl peroxide, myristoyl peroxide, stearyl peroxide, and the like.

Although the above discussed peroxides are preferred, the ketone peroxides and aldehyde peroxides are also useful. It was found that, using the aforesaid peroxides, only partial polymerization of antioxidant monomers resulted indicating that alkyl radicals were instantaneously formed during the decomposition. However, the ketone peroxides and aldehyde peroxides gave generally lower yields of the antioxidant polymers and at times yellow-colored polymers were obtained indicating that besides the polymerization, oxidation of the hindered phenolic group also occurred.

Monomers used to produce the polymeric antioxidants of the present invention are included within the following class of compounds:

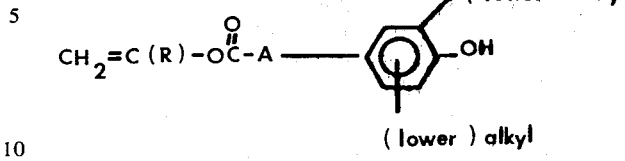

wherein
R is hydrogen or methyl group
A is $-C_nH_{2n}-$, $n = 0$ to 6, straight or branched, preferably 0 or 2; $-C_mH_{2m}O-$, $m = 1$ to 6, preferably 1 or 2

Lower alkyl groups containing up to and including 6 carbon atoms and illustratively include methyl, ethyl, n-propyl, isopropyl, n-butyl, t-butyl, hexyl, and the like. These groups are substituents on the phenolic group. One alkyl substituent is in a position ortho to the hydroxy group and a second alkyl group is either (a) in the other position ortho to the hydroxy group or (b) in the position meta to the hydroxy group and para to the first alkyl group. Preferred are the dialkyl-4-hydroxyphenyl groups wherein the alkyl groups are branched groups such as isopropyl, t-butyl or t-hexyl. However, other arrangements are also contemplated, such as 3-t-butyl-6-methyl-4-hydroxyphenyl group, 3,5-di-isopropyl-4-hydroxyphenyl group, 3,4-di-t-hexyl-4-hydroxyphenyl group, 3,5-dimethyl-4-hydroxyphenyl group or 3,5-di-n-hexyl-4-hydroxyphenyl group.

The corresponding polymers of the monomers of the invention are those having repeating units of

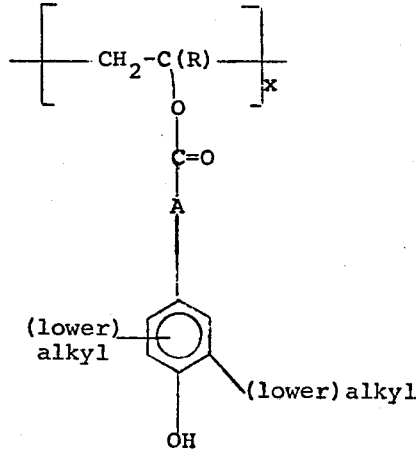

wherein
R and —A— have the same meaning as given above and $x$ is at least 2.

General procedures for preparing the antioxidant monomers used in producing the polymeric antioxidants of the present invention include the general methods used in preparing alkyl and aryl vinyl esters such as a. the direct reaction of acetylene with an acid

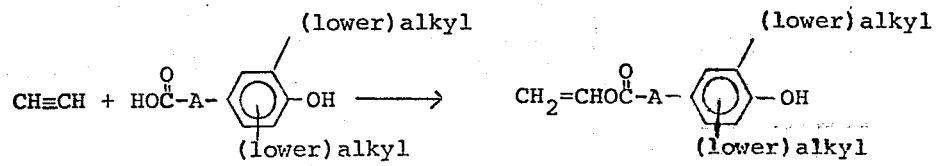

b. the acidolysis of vinyl acetate or isopropenyl acetate

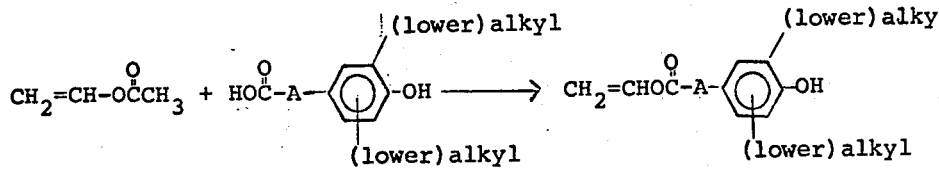

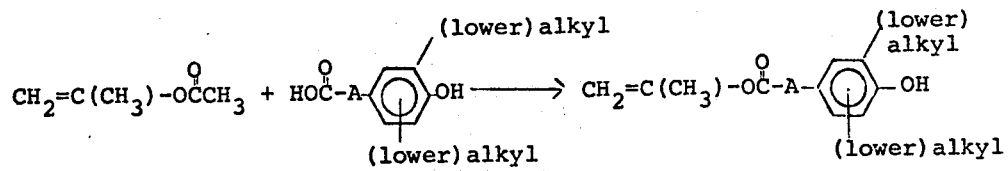

as described in C. E. Schildknecht, Vinyl and Related Polymers, page 323–385, (J. Wiley & Sons, Inc., New York 1952).

The preferred method, if the synthesis is carried out in a laboratory scale, is method (b), described in detail in Example 1 in the preparation, vinyl 3-(3,5-di-t-4-hydroxyphenyl) propionate.

EXAMPLE 1

PREPARATION OF VINYL 3-(3,5-di-t-BUTYL-4-HYDROXYPHENYL)PROPIONATE

A solution consisting of 13.9 g (0.05 mole) of 3-(3,5-di-t-butyl-4-hydroxyphenyl)propionic acid and 43.0 g (0.50 mole) or redistilled vinyl acetate was treated with 0.2 g of mercuric acetate while stirring at 50°C. After 15 minutes 0.02 ml of 100% sulfuric acid was added and the reaction mixture refluxed in nitrogen atmosphere for 3 hours. The reaction was cooled and neutralized with 0.5 g of sodium acetate ($Na_2C_2H_3O_2 \cdot 3H_2O$). The solution was decanted from the insoluble solids and stripped of volatiles, leaving 16.5 g of residue. This was dissolved in 50 ml of benzene and passed through a bed of 1.44 g of alumina (Woelm, neutral, activity II). The alumina was washed with an additional 200 ml of benzene. Removal of the solvent afforded 12.7 g (83.5% yield) of product which spontaneously crystallized to a white solid having melting point 70°–74°C. The product was crystallized from 50 ml of hexane with ice bath cooling to give 9.2 g, M.P. 71°–74°C. An analytical sample was obtained by treating 1.05 g in a sublimation apparatus at 100°C/0.05 mm. There was obtained 1.00 g (95% recovery) of sublimate having melting point 72°–75°C and whose NMR spectrum conformed to the expect structure.

Analysis Calculated for $C_{19}H_{28}O_3$: C, 74.96; H, 9.27; Found: C, 75.12; H, 9.17.

Employing the method described in Example 1, the following vinyl esters are prepared from vinyl acetate or isopropenyl acetate and the listed acids containing hindered phenolic groups:

TABLE I

| EXAMPLES | VINYL ESTER |
|---|---|
| 2 | $CH_2=CHOCCH_3 + HOC\langle X \rangle OH \longrightarrow CH_2=CHOC\langle X \rangle OH$ |
| 3 | $CH_2=CHOCCH_3 + HOC\langle \rangle OH \longrightarrow CH_2=CHOC\langle \rangle OH$ |
| 4 | $CH_2=CHOCCH_3 + HOC\langle X \rangle OH \longrightarrow CH_2=CHOCCH_2\langle X \rangle OH$ |
| 5 | $CH_2=CHOCCH_3 + HOCCH_2O\langle \rangle OH \longrightarrow CH_2=CHOCCH_2O\langle \rangle OH$ |
| 6 | $CH_2=C(CH_3)OCCH_3 + HOCCH_2CH_2\langle X \rangle OH \longrightarrow CH_2=C(CH_3)OCCH_2CH_2\langle X \rangle OH$ |
| 7 | $CH_2=CHOCCH_3 + HOCCH_2CH_2\langle \rangle OH \longrightarrow CH_2=C(CH_3)OCCH_2CH_2\langle \rangle OH$ |

TABLE I (cont.)

| EXAMPLES | VINYL ESTER |
|---|---|
| 8 | 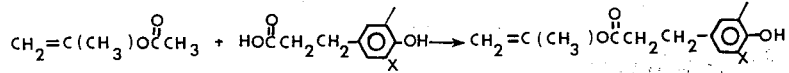 |
| 8a | 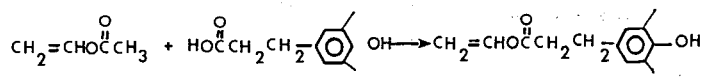 |
| 8b | 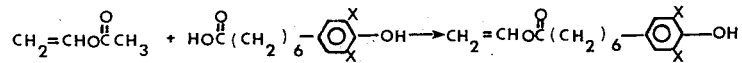 |

In the above Table I, the substituents on the phenyl ring are defined as follows:
- — (a straight line) denotes methyl group;
- —< denotes isopropyl group;
- x denotes tert-butyl group.

The procedures used in preparing the acids listed in Table I have been disclosed in the prior art. The syntheses of these acids include the reaction of alkali metal salts of an alkylated phenol with methyl acrylate; the reaction of alkali metal salts of alkylated phenols with esters of α-haloalkanoic acids; the reaction of alkylhydroxybenzyl chlorides with alkali metal cyanides to obtain alkylhydroxyphenylacetonitriles followed by hydrolysis to the acids.

Where esters are prepared by the above-mentioned methods, the free acids can be obtained by hydrolysis of the ester with sodium hydroxide. The preparation of some of the acids employed herein is also described in U.S. Pat. No. 3,249,632.

The novel vinyl ester polymers containing hindered phenolic groups are useful as antioxidants for organic materials subject to oxidative or thermal degradation. These polymers are particularly useful as antioxidants for polyolefins such as polypropylene or polyethylene. Other synthetic polymers which are stabilized by the polymeric antioxidants of this invention are polystyrene, polyvinyl chloride, nylon and other polyamides, polyesters, cellulosics, polyacetals, polyurethanes, petroleum and wood resins, mineral oils, animal and vegetable fats, waxes, rubbers such as styrene-butadiene rubber (SBR), acrylonitrile-butadiene-styrene (ABS), olefin-copolymers, ethylene-vinyl-acetate copolymers, polycarbonates, polyacrylonitrile, poly(4-methyl pentene-1) polymers, polyoxymethylenes, and the like.

It has been found that where the polymer requiring protection against oxidative degradation is a solid material such as, for example, a polypropylene, polyethylene, nylon, polyacetal, polyurethane, styrene-butadiene rubber, acrylonitrile-butadiene-styrene rubber, and the like, the polymeric antioxidant should have a relatively low molecular weight, i.e., it should be an oligomeric substance, i.e., a polymer having a molecular weigh between about 400 and about 6000. The most useful and the highest antioxidant activities are obtained by the use of oligomers having a molecular weight between about 500 and about 1500. Polymeric antioxidants having a higher degree of polymerization are not compatible with high molecular weight polymers and are therefore less effective with substances of this type.

It has also been found that where the polymeric material requiring protection against oxidative degradation is not a solid material but is a liquid or a semi-liquid such as, for example, an oil or a wax, the polymeric anti-oxidants may have a higher molecular weight, i.e., a molecular weight in excess of about 6000. With a higher degree of polymerization, there are sometimes secondary goals or advantages that may be achieved. In oils, for instance, high molecular weigh polymeric antioxidants act additionally as thickening agents and viscosity index improvers.

Polymeric antioxidants of this invention are useful in stabilizing various polymers as noted above. For this purpose the polymeric antioxidant are employed in the concentration of from 0.01 to 5% by weight based on the weight of the substrate to be stabilized. Preferably the concentration of the antioxidant is from about 0.1 to about 2%.

Polymeric substrates can also be stabilized by copolymerizing the vinyl ester monomers of this invention containing a hindered phenolic group with ethylenically unsaturated comonomers. In the resulting copolymers the antioxidant monomer moiety is an integral part of a polymer chain. To form copolymers which are resistant to oxidative and thermal degradation at least 0.01% by weight of an antioxidant monomer is copolymerized with an ethylenically unsaturated monomer. Preferably at least 0.1% of an antioxidant monomer is employed. Copolymers containing higher concentrations of an antioxidant monomer, e.g. 20%, 50% or 80%, are also conveniently prepared. Similarly homopolymers of the antioxidant monomers can be prepared. Such copolymers and homopolymers can be incorporated into polymers using conventional procedures. For example, the polymeric antioxidants are incorporated into the material to be stabilized by any suitable means such as by milling the antioxidant on hot or cold mill rolls, by mixing it in by the use of a Banbury mixer or other well-known devices of this nature or the antioxidant may be mixed with the polyolefin material in the form of molding powder and incorporated during extrusion or prior to extrusion or during injection molding. The antioxidant may even be incorporated into a solution of the polyolefin material which solution may then be employed for the formation of films, for wet or dry spinning of fibers, monofilaments and the like. When copolymers are prepared the nature of the comonomers employed are important for several reasons. (A) It is well known that vinyl esters in general polymerize less readily with increasing length of the ester group and after a mixture of oligomers an unreacted monomer is obtained. With certain comonomers, however, such as fumarates or maleates, polymerization occurs readily and high conversions are obtained.

(B) Comonomers can modify the physical properties of the polymeric antioxidants such as solubility characteristics as well as the solid state properties and can improve the compatibility of polymeric antioxidants with the polymers to be protected and increase therefore also the antioxidant activity.

The particular advantage of the polymeric antioxidants of this invention, especially wherein the antioxidant monomer is copolymerized with the substrate to be stabilized, is that such stabilizers have extraordinary resistance to extraction by organic or aqueous solvents. This property is of particular importance when the stabilized polymers come in contact with lubricating oils, dry cleaning fluids, petrolatum organic solvents in general which tend to extract the stabilizers from the polymeric substrates.

In general the novel vinyl esters containing hindered phenolic groups show the same copolymerization behavior as alkyl and aryl vinyl esters as described, for example, in detail in C. E. Schildknecht, Vinyl and Related Polymers, pages 323–385, (John Wiley & Sons, New York (1965)). Preferred comonomers which form readily alternating copolymers with the novel vinyl esters are:

maleates, fumarates, citraconates, mesaconates, itaconates and aconitates with alky groups from 1 to 18 carbon atoms; maleic anhydride, citraconic anhydride and itaconic anhydride; maleimides, citraconimides and itaconimides with alky groups from 1 to 18 carbon atoms.

Additionally, the antioxidant vinyl esters can also be copolymerized with any ethylenically unsaturated monomers which discussed initiators and under the below mentioned conditions. Such comonomers are:

acrylates and methacrylates with alkyl groups from 1 to 18 carbon atoms; ethylene and chloro-, fluoro- and cyano-derivatives of ethylene such as vinyl chloride, vinylidine chloride, vinyl fluoride, vinylidene fluoride, acrylonitrile, methyacrylonitrile and higher chlorinated and fluorinated ethylenes; alkyl and aryl vinyl esters, preferably those having short ester groups such as vinyl acetate, isopropenyl acetate, vinyl benzoate, vinyl propionate, vinyl butyrate, vinyl diethyl acetate and vinyl trimethyl acetate.

Also useful as comonomers are alkylesters of crotonic and cinnamic acid with 1 to 18 carbon atoms in the ester groups and $\alpha,\beta$-unsaturated esters containing a hindered phenolic group as disclosed in the copending application Ser. No. 738m770, filed June 21, 1968.

The copolymers prepared as described above contain repeating units of a vinyl ester monomer described above and of an ethylenically unsaturated comonomer also described above.

Polymerization of the monomers may be carried out in bulk, solution, suspension or emulsion according to techniques well known to those skilled in the art. The preferred polymerization technique is the solution polymerization procedure using solvents such as benzene, toluene, xylene and other aromatic solvents or chlorinated solvents such as chloroform, tetrachloroethylene, and the like, and initiators as described supra in quantities varying between 0.10% and 2% based upon the weight of the monomers. Polymerization temperatures are dependent upon the initiator used and are usually between 40° and 100°C.

It was also found that, in conducting the polymerization, the solvent could be advantageously replaced by the use of either distearylthiodipropionate or dilaurylthiodipropionate. These compounds are referred to as "synergists" since they increase the activity or effect of the polymeric antioxidants of the present invention. The aforesaid synergists are used in ratios of approximately three parts synergist to one part antioxidant. Further, by using either distearylthiodipropionate or dilaurylthiodipropionate as solvents in the polymerizations of antioxidant monomers, two important advantages are obtained: (1) the solvent stripping operation after the polymerization is eliminated and (2) the antioxidant polymer-synergist mixture solidifies at room temperature after the polymerization to a white mass which can be easily pulverized. Such powders are preferred as additives as compared with high viscous or solid polymers.

The following examples illustrate the procedures used in the preparation of polymeric antioxidants of the present invention and also illustrate the various tests conducted with respect to such polymeric antioxidants. These examples are not to be considered as limiting but only as illustrative of the present invention.

EXAMPLES 9–13

The copolymerization of a representative antioxidant comonomer, vinyl 3-(3,5-di-t-butyl-4-hydroxyphenyl)-propionate (Example 1) and maleic anhydride with different initiators to produce the corresponding alternating copolymers is set out in Table II below. The polymerization was effected by dissolving $2 \times 10^{-3}$ moles of each monomer and $8 \times 5^{-5}$ moles of the initiator in chloroform. The amount of chloroform used is twice the combined weights of the monomers. The polymerization was conducted under nitrogen and using the temperature and time set out in Table II.

TABLE II

| EXAMPLES | INITIATORS (0.02 moles/mole MONOMER) | POLYM. TEMP. (°C) | POLYM. TIME (HRS) | YIELD OF ALTERNATIVE COPOLYMER |
|---|---|---|---|---|
| 9 | 2,2-azo-bis-isobutyronitrile | 65 | 19.5 | 82.9% |
| 10 | 1,1-azo-bis-1-cyclohexane carbo-nitrile | 85 | 19.5 | 80.8% |
| 11 | decanoyl peroxide | 60 | 18 | 70.0% |
| 12 | lauroyl peroxide | 60 | 18 | 72.2% |
| 13 | methyl-ethyl-ketone peroxide | 100 | 21 | 43.5% |

Under these conditions, the polymerization was interrupted after 1.5 half life-time of every initiator. The copolymer yield was determined after precipitating the polymer solution into 20 times the amount by weight of hexane and drying the white, brittle polymer.

The alternating copolymer of the vinyl ester of Example 1 and maleic anhydride polymerized with azo-bis-isobutylnitrile as illustrated in Example 9 has the following physical properties:

| | |
|---|---|
| Molecular weight ($\bar{M}_n$): | 6,130 |
| Second order transition temperature($T_g$, DTA) | 103°C |
| Melting Point($T_m$, DTA): | 145°C |

EXAMPLES 14–16

The following examples illustrate the synthesis of copolymers of the vinyl ester of Example 1 and different comonomers employing azo-bis-isobutyronitrile as the initiator. 20 Parts of the vinyl ester of Example 1, 80 parts of the comonomers as listed in Table III, 1 part of the azo-bis-isobutyronitrile and 100 parts of benzene are sealed in an ampul under nitrogen and polymerized for 16 hours at 80°C. The polymer solutions are diluted with benzene to 20% solutions and are precipitated into 20 times the amount of hexane. The precipitated copolymers are dried and characterized as shown in Table III:

TABLE III

| EXAMPLES | ANTIOXIDANT MONOMER EX.1 % by wt.* | CO-MONOMER % by wt.* | APPEARANCE OF COPOLYMER | MOL. WEIGHT $\bar{M}_n$ |
|---|---|---|---|---|
| 14 | 31.8 | vinyl acetate 68.2 | white brittle powder | 7.680 |
| 15 | 36.0 | vinyl benzoate 64.0 | white, brittle powder | 6,460 |
| 16 | 15.0 | n-butyl acrylate 85.0 | colorless high viscous oil | 42,000 |

*ratios of antioxidant monomer to comonomer determined by elemental analysis.

EXAMPLES 17–19

The following examples illustrate the synthesis of alternating copolymers of the vinyl ester of Example 1 and di-n-octyl fumarate employing azo-bis-isobutyronitrile as the initiator and n-octyl mercaptan as the chain transfer agent to regulate the molecular weight. 100 Parts of equimolar amounts of the vinyl ester of Example 1 and di-n-octyl fumarate, 1 part of azo-bis-isobutyronitrile, 100 parts of chloroform and n-octyl mercaptan in ratios as indicated in Table IV were sealed in an ampul under nitrogen and polymerized for 16 hours at 80°C. The resulting polymer solutions were either high vacuum dried or diluted to 20% solutions with chloroform and precipated into 20 times the amount of methanol. The dried copolymers are characterized as shown in Table IV.

TABLE IV

| EXAMPLES | MOLES MERCAPTAN PER MOLE OF VINYL-ESTER AND DIOCTYL FUMARATE | MOL. WEIGHT OF POLYMER CALC. - FOUND | | APPEARANCE OF POLYMER |
|---|---|---|---|---|
| 17 | 1 | 791 | 886[1] | clear, viscous oil |
| 18 | 0.66 | 1,114 | 1,112[1] | clear, viscous oil |
| 19 | None | — | 23,200[2] | colorless slightly tacky polymer |

[1]Mol. Weight calculated from S-analysis
[2]Mol. Weight ($\bar{M}_n$) determined by osomometry

EXAMPLES 20–21

Example 18 was repeated but instead of n-octyl mercaptan, n-dodecyl mercaptan and n-hexadecyl mercaptan were employed leading to similar products.

EXAMPLES 22–30

100 Parts of equimolar amounts of the vinyl esters of Examples 2–10 and di-n-octyl fumarate, 100 parts of chloroform and 1 part of azo-bis-isobutyronitrile are sealed in an ampul under nitrogen and polymerized for 16 hours at 80°C. The polymer solutions are then diluted to 20% solutions with chloroform and precipitated into 20 times the amount of methanol. The precipitated and dried polymers are similar in appearance to the polymer of Example 19 with molecular weights ranging from 16 to 34,000.

EXAMPLE 31

HOMOPOLYMER OF VINYL 3-(3,5-DI-t-BUTYL-4-HYDROXYPHENYL) PROPIONATE

100 Parts of the vinyl ester of Example 1 and 2 parts of azo-bis-isobutyronitrile were sealed in an ampul under nitrogen and polymerized for 22 hours at 80°C. The result was a mixture of unreacted monomer plus a polymer. After removing the unreacted monomer by high vacuum sublimation at 100°C, 27.6 parts of a soft, white polymer was obtained: IR: confirms structure Analysis Calc'd for $(C_{19}H_{28}O_3)_n$: Calc: C, 74.96; H, 9.27; Found: C, 75.34; H, 8.95

The result, i.e., low conversion in the case of the homo-polymerization of a vinyl ester derived from a high molecular weight acid is not surprising and conforms with the general behavior of vinyl esters derived from higher aliphatic acids (see C. E. Schildknecht, Vinyl and Related Polymers, page 377, John Wiley & Sons, Inc., New York, 1952).

The oxidation of most polymers is so slow at ambient temperatures, even in the absence of antioxidants, that testing of the effects of antioxidants must be conducted at high temperatures to yield results within a convenient time. The tests conducted on the materials listed in the following Tables were conducted in a tubular oven with an air flow of 400 feet per minute at an oven temperature of 150°C. The oven aging is set out in hours. The expression "Failure" indicates the first sign of decomposition of the polymer.

In preparing the sample for testing, unstabilized polypropylene powder is thoroughly blended with the indicated polymeric antioxidant. The blended material is thereafter milled on a two roller mill at a temperature of 182°C for 6 minutes after which time the stabilized polypropylene is sheeted from the mill and allowed to cool. The polypropylene sheet containing the stabilizer is then cut into small pieces and pressed for seven minutes on a hydraulic press at 218°C and 174 pounds per square inch pressure. The resultant sheet of 25 mil thickness is then tested for resistance to accelerated aging in the above-described tubular oven.

TABLE V

EVALUATION OF ANTIOXIDANT COPOLYMERS IN POLYPROPYLENE
(25 mil), TUBULAR OVEN, 150°C
EXAMPLES HOURS TO FAIL
(see Table IV)

| | 0.25% Antioxidant + 0.5% UV-2[1] | 0.1% Antioxidant + 0.5% UV-2 + 0.3% DSTDP[2] |
|---|---|---|
| 17 | 525 | 500 |
| 18 | 50 | 280 |
| 19 | <20 | <20 |

[1]UV-2, an ultraviolet absorber 2-(3,5-di-t-butyl-2-hydroxyphenyl)-5-dichlorobenzotriazole
[2]DSTDP=distearylthiodipropionate, commercial synergist for antioxidants.

Where no antioxidant is added to the polypropylene in the above oven aging test, the "Hours to Fail" is less than 5 hours.

TABLE VI

EVALUATION OF ANTIOXIDANT HOMPOLYMER IN POLYPROPYLENE (25 mil),
TUBULAR OVEN, 150°C
EXAMPLE HOURS TO FAIL

| | 0.5% Antioxidant | 0.1% Antioxidant + 0.4% DSTDP |
|---|---|---|
| 31 | 405 | 575 |

Results similar to those reported in Table V and VI are obtained when the antioxidants of Examples 17, 18 and 21 are employed together with the indicated synergists and ultraviolet absorber listed in Table VII.

TABLE VII

| PRODUCT[4] | SECONDARY ANTIOXIDANT | UV ABSORBER |
|---|---|---|
| 17 | DSTDP | 2-(3-t-butyl-2-hydroxy-5-methylphenyl)-5-chlorobenzotriazole |
| 18 | DLTDP[3] | 2-hydroxy-4-n-octyloxybenzophenone |
| 31 | Tris-nonylphenylphosphite | 4-dodecyloxy-2-hydroxybenzophenone |
| 17 | trilauryl trithiophosphite | 4-t-octylphenyl salicylate |
| 18 | DLTDP | phenylsalicylate |
| 31 | DLTDP | 4-t-butylphenyl salicylate |
| 17 | tris-nonylphenylphosphite | 2,4-dihydroxybenzophenone |
| 18 | DSTDP | 2-hydroxy-4-methoxybenzophenone |
| 31 | trilauryl trithiophosphite | 5-chloro-2-hydroxybenzophenone |

[3]DLTDP - dilaurylthiodipropionate
[4]Refers to Example number

It should be noted that in all above examples of stabilizing compositions the use of the secondary antioxidant or the synergists and an ultraviolet absorber is optional. However, for best results, said additives should be employed in conjunction with the antioxidants of this invention, especially the synergists. These additional additives may be used in the amount of from about 0.05 to about 5% each, and preferably from about 0.1 to about 2% by weight of the substrate.

What is claimed is:

1. A polymer containing at least 0.05% by weight of repeating units having the structure

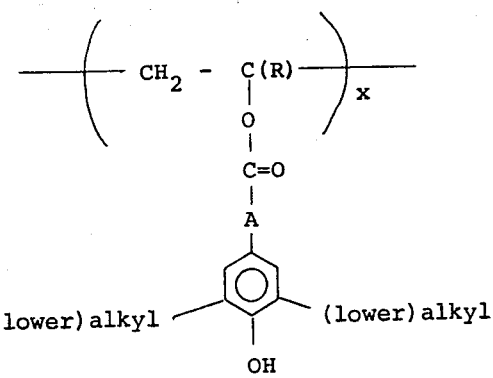

wherein
R is hydrogen or methyl group
A is —$C_nH_{2n}$— where $n$ is 0 to 6 or $C_mH_{2m}$—O— where $m$ is 1 to 6 and
$x$ is 2 or more.

2. The polymer of claim 1 wherein said (lower) alkyl groups are tertiary alkyl.

3. A homopolymer of claim 2.

4. A polymer of claim 3, which is a homopolymer of vinyl 3-(3,5-di-t-butyl-4-hydroxyphenyl)propionate.

5. The polymer of claim 2 wherein —A— is —$C_nH_{2n}$— where $n$ is 0 or 2.

6. The polymer of claim 2 wherein —A— is —$C_mH_{2m}$—O— where $m$ is 1 or 2.

7. A polymer of claim 2, which is a copolymer consisting essentially of said repeating unit and a repeating unit derived from an ethylenically unsaturated comonomer.

8. A copolymer of claim 7 wherein the comonomer is vinyl acetate.

9. A copolymer of claim 7 wherein the comonomer is vinyl benzoate.

10. A copolymer of claim 7 wherein the comonomer is n-butyl acrylate.

11. A copolymer of claim 7 wherein the comonomer is di-n-octyl fumarate.

12. A copolymer of claim 6 which is a copolymer of vinyl 3-(3,5-di-t-butyl-4-hydroxyphenyl)propionate and di-n-octyl fumarate.

13. A copolymer of claim 6 which is a copolymer of vinyl 3-(3,5-di-t-butyl-4-hydroxyphenyl)propionate and vinyl acetate.

14. A copolymer of claim 6 which is a copolymer of vinyl 3-(3,5-di-t-butyl-4-hydroxyphenyl)propionate and vinyl benzoate.

15. A copolymer of claim 6 which is a copolymer of vinyl 3-(3,5-di-t-butyl-4-hydroxyphenyl)propionate and n-butyl acrylate.

16. An organic material subject to oxidative or thermal degradation stabilized with a polymer of claim 1.

17. An organic material subject to oxidative or thermal degradation stabilized with a copolymer of claim 6.

18. A composition of claim 16 wherein said organic material is polyolefin.

19. A composition of claim 16 wherein said organic material is polypropylene.

20. A composition of claim 16 wherein polyolefin is stabilized with a copolymer of 3-(3,5-di-t-butyl-4-hydroxyphenyl)propionate and di-n-octyl fumarate, vinyl acetate, vinyl benzoate or n-butyl acrylate.

21. A composition of claim 16 wherein polypropylene is stabilized with a copolymer of vinyl 3-(3,5-di-t-butyl-4-hydroxyphenyl)propionate and di-n-octyl fumarate.

22. A composition of claim 16 wherein polypropylene is stabilized with a homopolymer of vinyl 3-(3,5-di-t-butyl-4-hydroxyphenyl)propionate.

23. A copolymer of claim 16 wherein the ethylenically unsaturated monomer is selected from the group of maleates, fumarates, citraconates, mesaconates, itaconates and aconitates with alkyl groups from 1 to 18 carbon atoms; maleic anhydride, citraconic anhydride and itaconic anhydride; maleimides, citraconimides and itaconimides with alkyl groups from 1 to 18 carbon atoms; and alkyl and aryl vinyl esters.

* * * * *